Figure 1:
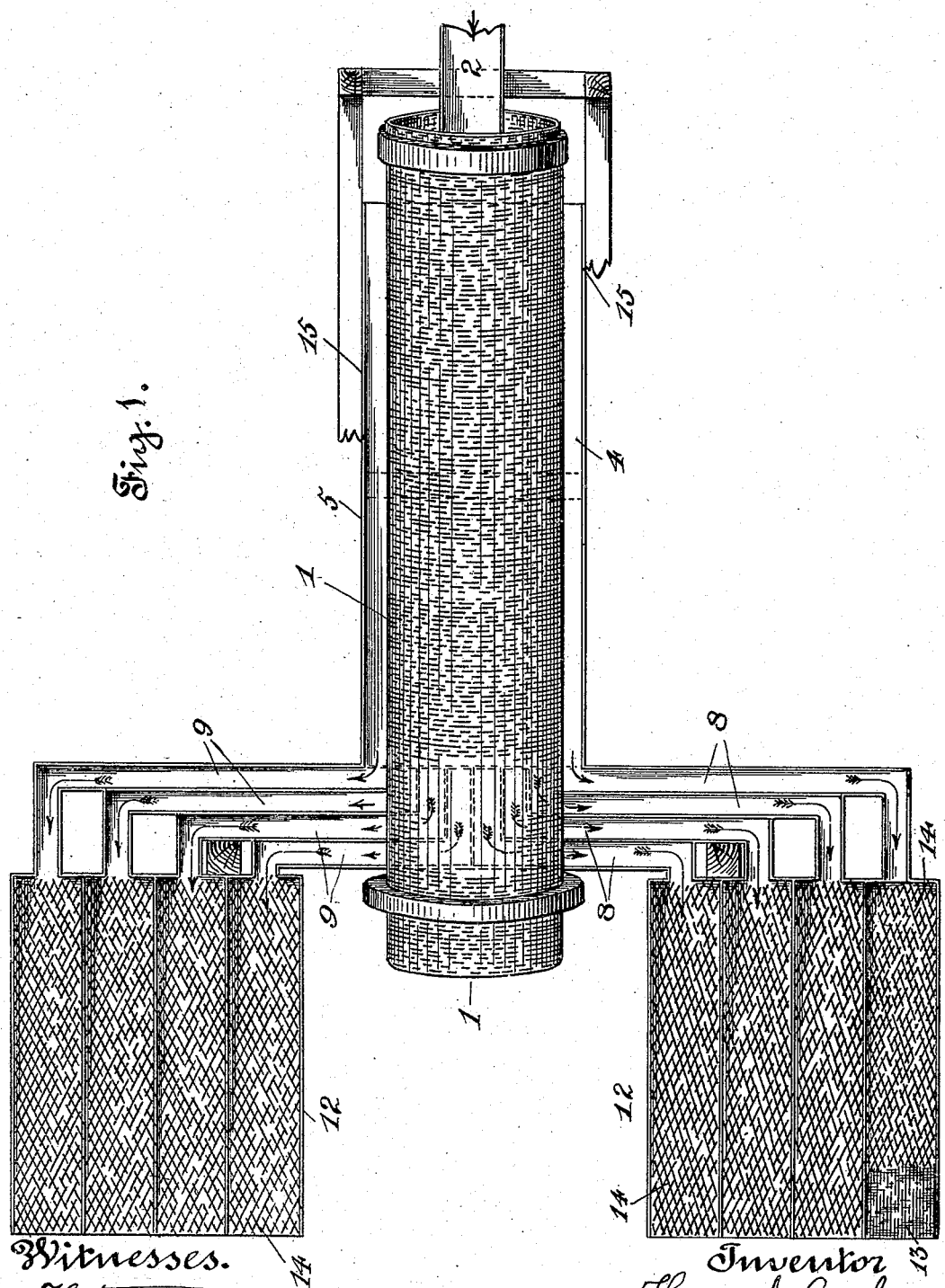

T. J. BARBOUR.
COLLECTING MEANS FOR GOLD DREDGES.
APPLICATION FILED DEC. 21, 1905.

936,754.

Patented Oct. 12, 1909.
3 SHEETS—SHEET 1.

Witnesses.
H. Monteverde.
J. Compton.

Inventor
Thomas J. Barbour
by N. A. Acker
his atty.

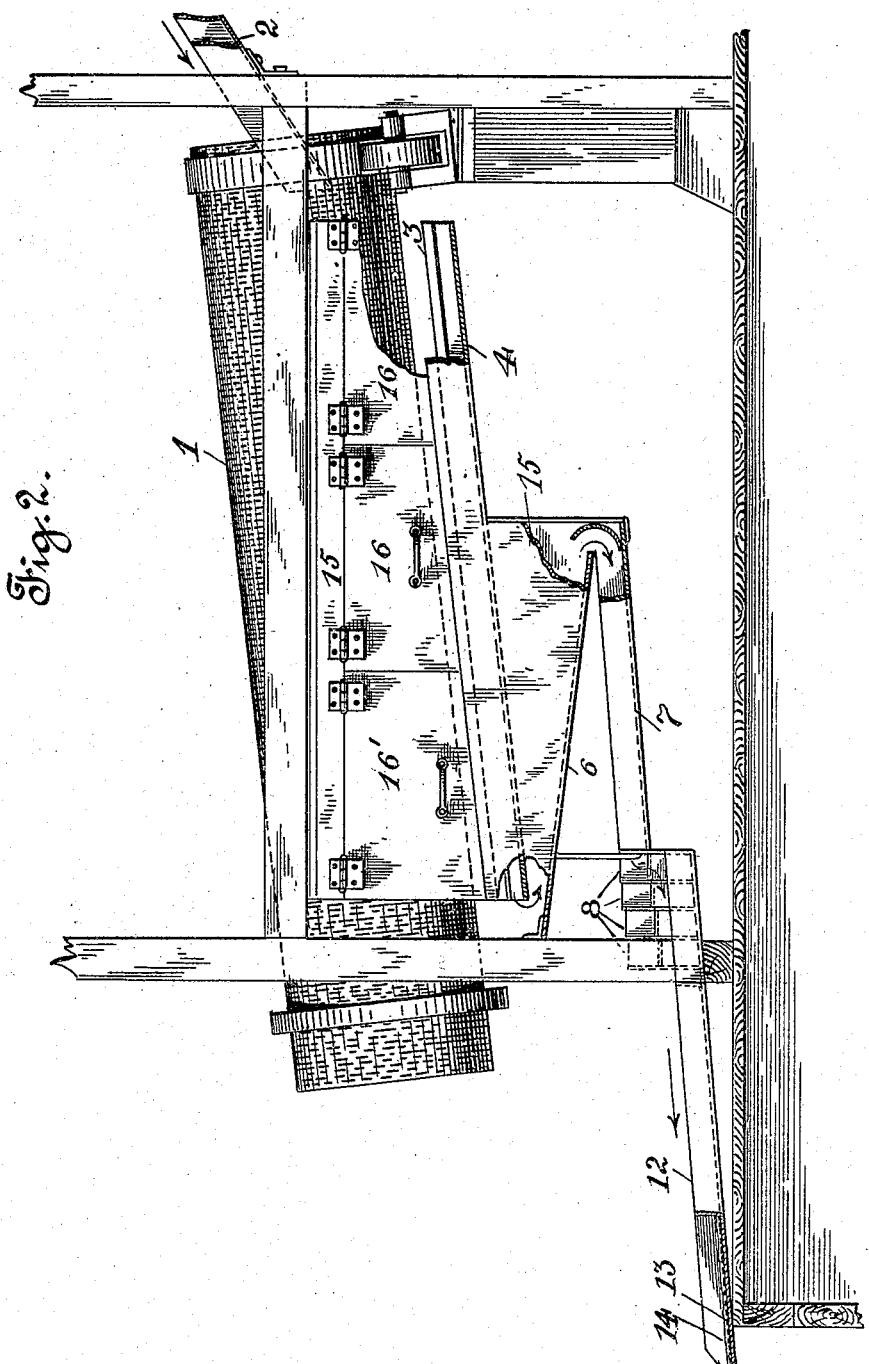

T. J. BARBOUR.
COLLECTING MEANS FOR GOLD DREDGES.
APPLICATION FILED DEC. 21, 1905.
936,754.
Patented Oct. 12, 1909.
3 SHEETS—SHEET 3.
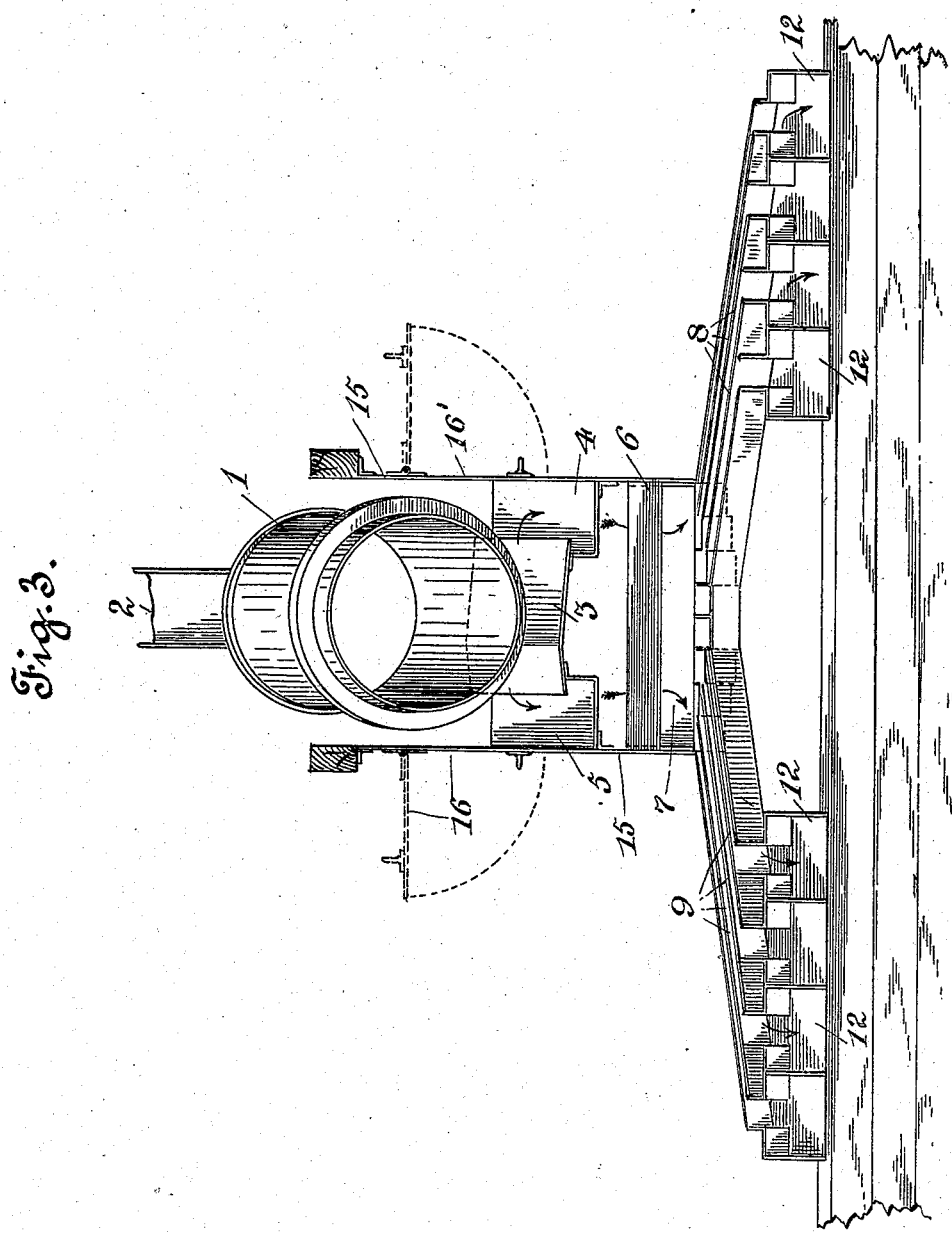

UNITED STATES PATENT OFFICE.

THOMAS J. BARBOUR, OF SAN FRANCISCO, CALIFORNIA.

COLLECTING MEANS FOR GOLD-DREDGES.

936,754.   Specification of Letters Patent.   Patented Oct. 12, 1909.

Application filed December 21, 1905. Serial No. 292,745.

*To all whom it may concern:*

Be it known that I, THOMAS J. BARBOUR, a citizen of the United States, residing in the city and county of San Francisco, State of California, have invented certain new and useful Improvements in Collecting Means for Gold-Dredgers; and I hereby declare the following to be a full, correct, and exact description of the same.

The present invention relates to an arrangement of sluice-ways and tables for the recovery of the precious metals contained in the material carried thereover, which material is delivered thereto from a separator of a gold dredging apparatus; the object of the invention being to materially increase the area of the collecting surface over which the material is forced to travel, thereby permitting the handling of a greater quantity of material within a given time, and the recovery of a greater percentage of the fine precious metals contained within the material carried over the surface of the collecting means.

To comprehend the invention, reference should be had to the accompanying drawings, wherein—

Figure 1 is a plan view of the collecting means, with the rotary separator in proper position relative to the side sluice-way for receiving the material discharged from the said rotary separator onto the distributing plate or table arranged below the rotary separator. Fig. 2 is a side view in elevation of the parts disclosed by Fig. 1 of the drawings. Fig. 3 is an end view in elevation viewed from the discharge end of the collecting tables.

The numeral 1 designates any suitable form of a separator, although in the present case the same indicates a rotary separator or "grizzly", which is mounted at an inclination. Where a rotary separator or "grizzly" is used, the same is cylindrical in form in cross section. Any suitable means, not shown, may be employed for imparting rotation to the separator or "grizzly", the dredged material to be treated or worked being delivered onto a chute 2, which leads the material into the upper end of the inclined separator or "grizzly" 1. This separator or "grizzly" is arranged a slight distance above a longitudinally disposed distributing plate 3, which receives the material discharged through the openings of the separator or "grizzly". The said distributing plate or plates is supported at an inclination corresponding to that of the separator or "grizzly", the receiving surface of the distributing plate or plates being inclined laterally, so as to equally distribute the material delivered thereon to the side sluice boxes 4—5, the collecting surface of each sluice box being preferably covered with riffled plates or bars, not shown. These sluice-boxes are run at a downward inclination toward the laterally disposed distributing launders. Due to the inclination of the side sluice-boxes, together with the force of the water flowing through the boxes, the material delivered from the distributing plate or plates 3, is carried the entire length of the said boxes, and discharged therefrom into the return sluice-way or box 6, which box is arranged at an opposite inclination to that of the downwardly inclined sluice-boxes 4—5. This sluice-box 6 communicates at its lower forward end with the second or lower return sluice-way or box 7, which said sluice-way or box is arranged at an opposite inclination to that of the sluice-way or box 6. Like sluice-ways or boxes 4—5, the surface of each sluice-way or box 6—7 is preferably covered with riffled plates or bars for catching as much of the valuable metals contained within flowing material as possible, while traveling through the longitudinally disposed sluice-ways or boxes 4, 5, 6 and 7. The oppositely inclined return sluice-ways 6—7 materially prolong the travel of the flowing material, and thus considerably increase the area of the collecting surface for the precious metal.

The lower return sluice-way or box 7 discharges into the laterally disposed inclined launders 8—9, which launders deliver the material onto the longitudinally disposed inclined collecting tables 12. Such of the valuable metals not caught in the system of sluice-ways or boxes will be recovered on the table 12, as the material is forced to travel over the said series of downwardly inclined collecting tables. To provide against the escape of the finer particles of precious metals by being carried over the discharge or tail end of the tables, and to give a riffled surface thereto, the face of each table is preferably provided with a covering 13 of riffled or fibrous material, such as cocoa-matting, over which is placed a layer 14 of expanded metal, which is held down in any suitable manner. In the present case, the separator or "grizzly" 1 is inclosed between the longitudinal side walls 15, access being had to the sluice-way 4—5, by means of the hinged doors 16—16', which doors are thrown upward for the purpose of making a "clean up" of said sluice-ways.

Having thus described the invention, what is claimed as new and desired to be protected by Letters Patent is—

1. The combination with a downwardly inclined separator grizzly, of a downwardly inclined distributer plate positioned beneath the grizzly and extending parallel therewith, the receiving surface of said plate being inclined downwardly from the central portion to the edges thereof, a longitudinally disposed downwardly inclined sluiceway arranged at each side of the distributing plate to receive the material flowing from the surface thereof, oppositely inclined return sluiceways arranged to successively receive the material flowing from the sluiceways positioned at the sides of the distributing plate, all of said sluiceways extending in the same direction as the grizzly and being positioned therebeneath, side walls housing all of said sluiceways and constituting a hopper partially inclosing the grizzly, a series of collecting tables, and a series of runways extending from the discharge end of the lowermost sluiceway to said tables.

2. The combination with a downwardly inclined rotary grizzly, of a downwardly inclined distributer plate positioned beneath the grizzly and extending in the same direction, a longitudinally disposed downwardly inclined sluiceway arranged at each side of the distributer plate to receive the material flowing from the surface thereof, oppositely inclined return sluiceways arranged to successively receive the material flowing from the sluiceways positioned at the sides of the distributer plate, all of said sluiceways extending in the same direction as the grizzly and being positioned directly therebeneath, side walls housing all of said sluiceways and constituting a hopper partially inclosing the grizzly, doors in said side walls affording access to the sluiceways and collecting tables communicating with the discharge end of the lowermost sluiceway.

In testimony whereof I have hereunto affixed my signature in the presence of witnesses.

THOMAS J. BARBOUR.

Witnesses:
AUGUSTUS TAYLOR,
GEORGE H. EVANS.